United States Patent
Ji

(10) Patent No.: US 9,654,996 B2
(45) Date of Patent: May 16, 2017

(54) METHOD AND DEVICE FOR MONITORING RADIO LINK

(71) Applicant: Huawei Technologies Co., Ltd., Shenzhen (CN)

(72) Inventor: Li Ji, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 149 days.

(21) Appl. No.: 14/618,522

(22) Filed: Feb. 10, 2015

(65) Prior Publication Data

US 2015/0156657 A1 Jun. 4, 2015

Related U.S. Application Data

(63) Continuation of application No. PCT/CN2012/080427, filed on Aug. 21, 2012.

(51) Int. Cl.
*H04L 12/26* (2006.01)
*H04W 24/08* (2009.01)
(Continued)

(52) U.S. Cl.
CPC ............ *H04W 24/08* (2013.01); *H04B 7/024* (2013.01); *H04W 24/04* (2013.01);
(Continued)

(58) Field of Classification Search
CPC .... H04L 45/28; H04L 43/50; H04J 2203/006; H04J 3/14; H04Q 11/045
See application file for complete search history.

(56) References Cited

U.S. PATENT DOCUMENTS

2007/0183355 A1* 8/2007 Kuchibhotla ..... H04W 52/0245
370/318
2010/0142492 A1* 6/2010 Huschke ................ H04B 7/022
370/336
(Continued)

FOREIGN PATENT DOCUMENTS

CN 101998474 A 3/2011
CN 102170330 A 8/2011
(Continued)

OTHER PUBLICATIONS

"CSI-RS Based RRM Measurement for DL CoMP," 3GPP TSG-RAN WG2, Meeting #78, Prague, Czech Republic, R2-122832, 3$^{rd}$ Generation Partnership Project, Valbonne, France (May 21-25, 2012).
(Continued)

*Primary Examiner* — Siren Wei
(74) *Attorney, Agent, or Firm* — Leydig, Voit & Mayer, Ltd.

(57) ABSTRACT

The present disclosure provides a method and a device for monitoring a radio link. In the method, a user terminal monitors a cell specific reference signal (CRS) and a channel state indication reference signal (CSI-RS), and judges whether to initiate radio resource control (RRC) connection re-establishment according to the CRS and the CSI-RS. The device provided in an embodiment of the present disclosure includes a monitoring unit and a judging unit. By applying the technical solutions provided in the embodiments of the present disclosure, monitoring of the radio link can be more accurate, and RRC connection re-establishment can be performed in time, to reduce occurrence of misjudgments, thereby improving the experience on the user terminal.

8 Claims, 4 Drawing Sheets

(51) Int. Cl.
   *H04B 7/024*    (2017.01)
   *H04W 24/04*   (2009.01)
   *H04W 56/00*   (2009.01)
   *H04W 76/02*   (2009.01)
   *H04L 5/00*     (2006.01)

(52) U.S. Cl.
   CPC ....... *H04W 56/001* (2013.01); *H04W 76/027* (2013.01); *H04W 76/028* (2013.01); *H04L 5/005* (2013.01); *H04L 5/0035* (2013.01)

(56) References Cited

U.S. PATENT DOCUMENTS

| | | | |
|---|---|---|---|
| 2012/0188950 A1* | 7/2012 | Luo | H04L 5/0035 370/329 |
| 2012/0208547 A1 | 8/2012 | Geirhofer et al. | |
| 2013/0044665 A1* | 2/2013 | Ng | H04W 52/242 370/311 |
| 2013/0250782 A1* | 9/2013 | Nimbalker | H04L 1/0038 370/252 |
| 2013/0301542 A1* | 11/2013 | Krishnamurthy | H04W 52/50 370/329 |
| 2013/0344868 A1* | 12/2013 | Yamada | H04B 7/024 455/436 |

FOREIGN PATENT DOCUMENTS

| | | |
|---|---|---|
| CN | 102474385 A | 5/2012 |
| CN | 102480756 A | 5/2012 |
| WO | WO 2011122833 A2 | 10/2011 |

OTHER PUBLICATIONS

"Interference measurement in support of downlink CoMP," 3GPP TSG-RAN WG1, Meeting #68-BIS, Jeju, South Korea, R1-121561, 3$^{rd}$ Generation Partnership Project, Valbonne, France (Mar. 26-30, 2012).

"3$^{rd}$ Generation Partnership Project; Technical Specification Group Radio Access Network; Evolved Universal Terrestrial Radio Access (E-UTRA); Requirements for support of radio resource management(Release 11)," 3GPP TS 36.133 V11.1.0, 3$^{rd}$ Generation Partnership Project, Valbonne, France (Jun. 2012).

1$^{st}$ Office Action and Search Report in cognate Chinese Patent Application No. 201280020565 (Sep. 1, 2016).

* cited by examiner

METHOD AND DEVICE FOR MONITORING RADIO LINK

CROSS-REFERENCE TO RELATED APPLICATIONS

This application is a continuation of International Patent Application No. PCT/CN2012/080427, filed on Aug. 21, 2012, which is hereby incorporated by reference in its entirety.

TECHNICAL FIELD

The present disclosure relates to the field of communications and, in particular, to a method and a device for monitoring a radio link.

BACKGROUND

Coordinated multipoint transmission/reception (briefed as CoMP) has an effect of improving data transmission speed, cell edge throughput and system throughput. In ordinary situations, a user terminal judges whether to initiate radio resource control (briefed as RRC) connection re-establishment according to a cell specific reference signal (briefed as CRS) sent by a cell. However, this method will lead to a misjudgment under a CoMP architecture, and thus may degrade a experience on a user terminal.

SUMMARY

Embodiments of the present disclosure provide a method and a device for monitoring a radio link, which is used for resolving the problem that under a CoMP architecture, misjudgment may occur while a user terminal judges whether to initiate RRC connection re-establishment according to a CRS sent by a cell.

In one aspect, an embodiment of the present disclosure provides a method for monitoring a radio link, which includes:

monitoring, by a user terminal, a CRS and a channel state indication reference signal (briefed as CSI-RS); and judging, by the user terminal, whether to initiate RRC connection re-establishment, according to the CRS and the CSI-RS.

In another aspect, an embodiment of the present disclosure provides a device for monitoring a radio link, which includes:

a monitoring unit, configured to monitoring a cell specific reference signal CRS and a channel state indication reference signal CSI-RS; and a judging unit, configured to judge, according to the CRS and the CSI-RS, whether to initiate radio resource control RRC connection re-establishment.

By applying the technical solutions provided in embodiments of the present disclosure, a user terminal judges whether to initiate RRC connection re-establishment according to the CRS and the CSI-RS, which can monitor a radio link more accurately, reduce misjudgment, and initiate RRC connection re-establishment in time, thereby improving the experience on the user terminal.

BRIEF DESCRIPTION OF DRAWINGS

FIG. 1 is a schematic diagram of a CoMP system architecture which the embodiments of the present disclosure is based on;

DESCRIPTION OF EMBODIMENTS

Technical solutions in embodiments of the present disclosure will be hereinafter described clearly and comprehensively with reference to the accompanying drawings. The described embodiments are merely part embodiments of the present disclosure, and for persons of ordinary skill in the art, the present disclosure also can be implemented by other embodiments which are not stick to these specific details.

Figure 1:
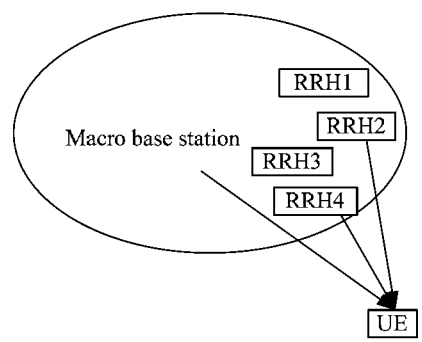

FIG. 1 is an architecture diagram of a CoMP system which the embodiments of the present disclosure is based on. The coverage of a macro cell of a macro base station includes one or more RRHs, and the one or more RRHs may be connected to the macro base station via a transmission cable (e.g. optical fiber). These RRHs are configured at an edge of the macro cell, in order to improve data transmission speed, cell edge throughput and system throughput. The macro base station may select one or more RRHs to serve a user terminal (such as to transmit data for a user terminal). Under the CoMP system architecture, a CoMP set serving a user terminal includes one or more RRHs which serve the user terminal. One CoMP set provides service to one user terminal, and different CoMP sets provide service to different user terminals. In the prior art, a user terminal judges whether to initiate RRC connection re-establishment, through a CRS sent by a cell. However, under the CoMP architecture, if a user terminal judges whether to initiate RRC connection re-establishment only according to the CRS, a misjudgment may occur. For example, under the CoMP architecture, a macro cell sends a CRS, and an RRH only sends a channel state indication reference signal (channel state information-reference signal in English, briefed as CSI-RS). Under this situation, if a user terminal at an edge of the macro cell performs monitoring a radio link failure only according to the CRS sent by the macro cell, it may be determined that a radio link failure occurs, and thus the user terminal will initiate RRC connection re-establishment. However, in fact, there may be an RRH that is nearer to the user terminal and serves the user terminal, the RRH sends CSI-RSs with a better signal quality, and thus the user terminal actually does not need to initiate the RRC connection re-establishment.

For another example, under the CoMP architecture, both the macro cell and the RRH send a CRS, and the RRH further sends a CSI-RS. Under this situation, the RRH sends the same CRS on the same physical resource as the macro cell, and the location of the CSI-RS sent by the RRH is staggered from that of the CRS. Under this situation, if the terminal locates at a position where the covering of signals of both the macro cell and the RRH is poor, theoretically, the CRS sent by the macro cell and the CRS sent by the RRH have a poor signal quality, then the CSI-RS received by the terminal has a poor quality either. However, the CRS received by the terminal is the CRS sent by the macro cell plus the CRS sent by the RRH, it is possible that the signal quality of the CRS received by the user terminal meet the condition that it is unnecessary to initiate the RRC connection re-establishment. If the user terminal judges whether a radio link failure occurs only according to its received CRS, then the user terminal may falsely determine that it is unnecessary to initiate the RRC connection re-establishment. Actually, the signal quality of data transmitted in the other channels (e.g., a physical downlink shared channel) received by the user terminal is already very poor, and the user terminal should initiate the RRC connection re-establishment to ensure that the experience on the user terminal is not degraded.

Figure 2:
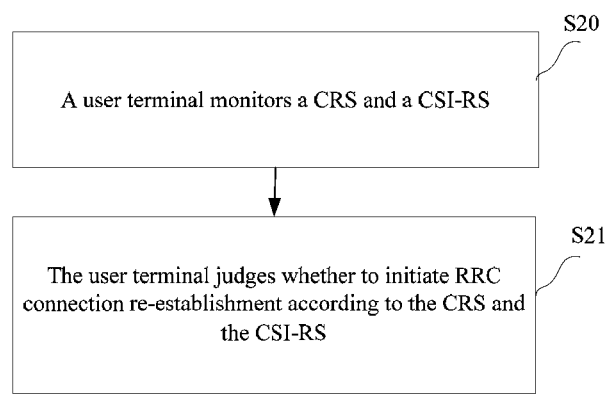
FIG. 2 is a schematic flowchart of a method for monitoring a radio link according to a first embodiment of the present disclosure.

A first embodiment of the present disclosure provides a method for monitoring a radio link, as shown in FIG. 2, the method includes following contents.

S20: a user terminal monitors a CRS and a CSI-RS.

S21: the user terminal judges whether to initiate RRC connection re-establishment, according to the CRS and the CSI-RS.

Optionally, the S21 may include:

S21-1: the user terminal monitors signal qualities of the CRS and the CSI-RS, if the signal quality of the CRS or the CSI-RS meets a requirement of in-synchronization or out-of-synchronization, a physical layer of the user terminal sends out-of-synchronization indication or in-synchronization indication to a RRC layer of the user terminal.

As an example, reference may be made to 3GPP TS 36.133 about how the above mentioned physical layer of the user terminal sends the out-of-synchronization indication and the in-synchronization indication to the RRC layer of the user terminal, which will neither be repeated nor limited hereby.

Further, the out-of-synchronization indication also includes an identifier, the identifier is used for indicating that it is the out-of-synchronization indication of the CRS or the out-of-synchronization indication of the CSI-RS.

Further, the in-synchronization indication also includes an identifier, the identifier is used for indicating that it is the in-synchronization indication of the CRS or the in-synchronization indication of the CSI-RS.

Further, the RRC layer of the user terminal can identify the out-of-synchronization indication or the in-synchronization indication of the CRS, and the out-of-synchronization indication or the in-synchronization indication of the CSI-RS through the above mentioned identifier.

S21-2: the RRC layer of the user terminal judges whether a radio link failure occurs according to the out-of-synchronization indication and the in-synchronization indication.

As an example, in a scenario where the user terminal does not use discontinuous reception (briefed as DRX), the physical layer of the user terminal calculates a signal-to-noise ratio of a reference signal (e.g., a CRS or a CSI-RS) once in every time length of a radio frame (e.g., the time length of a radio frame is 10 millisecond), where the signal-to-noise ratio may be a signal to interference plus noise ratio (briefed as SINR). The physical layer of the user terminal obtains a plurality of the above mentioned reference signals (e.g., first 20 reference signals) once every certain period of time (e.g., 200 millisecond) to acquire the SINR through a filtering way such as average filtering or mid-value filtering etc., and judges whether the signal-to-noise ratio is smaller than a threshold of out-of-synchronization (Qout), if yes, the physical layer of the user terminal reports out-of-synchronization indication (out-of-sync) to the RRC layer. The physical layer of the user terminal further calculates the SINR of a plurality of reference signals (e.g. first 10 reference signals) that are obtained once every certain period of time (e.g., 100 millisecond), judges whether the SINR is greater than a threshold of in-synchronization, and if yes, reports in-synchronization indication (in-sync) to the RRC layer. If the RRC layer of the user terminal receives the out-of-synchronization indication for successive N310 times (for the configuration of the value of N310, reference can be made to 3GPP TS 36.133), then a timer (e.g., T310) starts, and before the timer expires, if the RRC layer does not receive the in-synchronization indication for successive N311 times (for the configuration of the value of N311, reference can be made to 3GPP TS 36.133), the user terminal considers that a radio link failure occurs on this reference signal, and initiates the RRC connection re-establishment.

By applying the technical solution provided in the embodiment of the present disclosure, a user terminal judges whether to initiate RRC connection re-establishment according to the CRS and the CSI-RS, instead of judging whether to initiate the RRC connection re-establishment only according to the CRS. Thus, the user terminal can perform monitoring the radio link more accurately and perform the RRC connection re-establishment in time, to reduce occurrence of misjudgment, thereby improving the experience on the user terminal.

Figure 3:
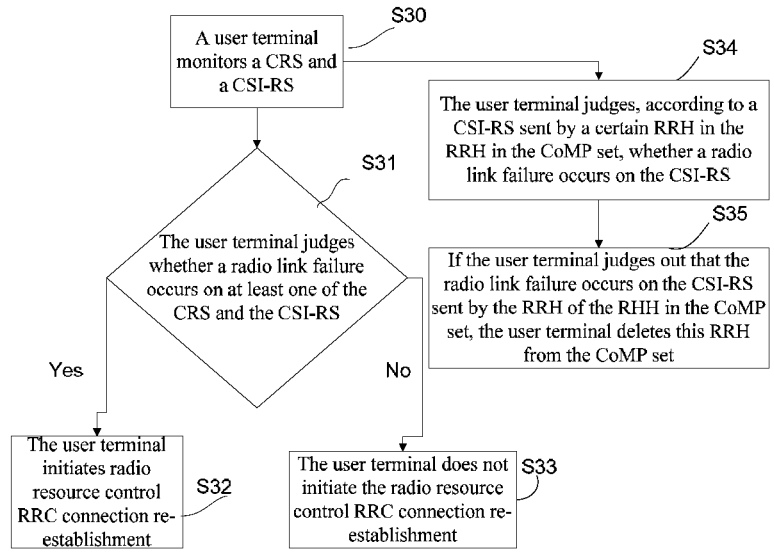
FIG. 3 is a schematic flowchart of a method for monitoring a radio link according to a second embodiment of the present disclosure.

A second embodiment of the present disclosure provides a method for monitoring a radio link, as shown in FIG. 3, the method includes the following contents.

The second embodiment of the present disclosure is a further extension to that of the first embodiment of the present disclosure, and the technical features of method, conceptions, effects etc. in the first embodiment of the present disclosure are applicable to the second embodiment of the present disclosure.

S30: a user terminal monitors a CRS and a CSI-RS.

S31: the user terminal judges, according to the CRS and the CSI-RS monitored, whether a radio link failure occurs on at least one of the CRS and the CSI-RS.

The CRS in the second embodiment of the present disclosure may be a CRS sent by a macro cell and a CRS sent by a RRH in a CoMP set. The CSI-RS in the second embodiment of the present disclosure may be a CSI-RS sent by the RRH in the CoMP set.

In the second embodiment of the present disclosure, as for judging whether a radio link failure occurs on the CRS or the CSI-RSs, reference may be made to the content described in step S21-2 in the first embodiment of the present disclosure.

S32: if the above mentioned user terminal judges out that the radio link failure occurs on at least one of the above mentioned CRS and CSI-RS, the above mentioned user terminal initiates RRC connection re-establishment.

Optionally, the method in the second embodiment of the present disclosure, may further include:

S33: if the above mentioned user terminal judges out that no radio link failure occurs on the CRS and the CSI-RS, the above mentioned user terminal does not initiate the RRC connection re-establishment.

Optionally, the method in the second embodiment of the present disclosure, may further include:

S34: the user terminal judges, according to the CSI-RS sent by a certain RRH in the CoMP set, whether the radio link failure occurs on the CSI-RS.

S35: if the user terminal judges out that the radio link failure occurs on the CSI-RS sent by the certain RRH in the CoMP set, the user terminal deletes this RRH from the CoMP set.

In the second embodiment of the present disclosure, the user terminal judges whether to initiate RRC connection re-establishment according to the CRS and the CSI-RS, instead of judging whether to initiate the RRC connection re-establishment only according to the CRS. Thus, the user terminal can perform monitoring the radio link more accurately, and perform RRC connection re-establishment in time, to reduce occurrence of misjudgment, thereby improving the experience on the user terminal. Specifically, under the situation that a macro cell sends a CRS, and an RRH in a CoMP set sends both the CRS and a CSI-RS, for a user terminal, the CRS is the CRS sent by the macro cell plus the CRS sent by the RRH in the CoMP set, if the user terminal judges whether a radio link failure occurs only according to the CRS, a misjudgment may be generated. For example, when the user terminal locates at a position where the covering of signals of both the macro cell and the RRH is poor, both the CRS sent by the macro cell and the CRS sent by the RRH have a poor signal quality (e.g. the user terminal is no longer under the coverage of the macro cell and its RRH), however a signal superposition of their CRS s (i.e. the CRS received by the user terminal) has a better signal quality, if at this time the user terminal judges whether the radio link fails only according to the CRS, it will be judged out that no radio link failure occurs, and thus there is no need to initiate RRC connection re-establishment, while the fact is that the covering of the signals of the macro cell and the RRH that provide service for the user terminal has already been poor, and the user terminal should initiate the RRC connection re-establishment in order to enable the experience on the user terminal not to be degraded. And thus, in the second embodiment of the present disclosure, the user terminal will initiate the RRC connection re-establishment when judging out that the radio link failure occurs on at least one of the CRS and the CSI-RS, which can reduce the misjudgments under the above mentioned situations as much as possible, thereby improving the experience on the user terminal.

Further, in the second embodiment of the present disclosure, the user terminal may further judge whether a radio link failure occurs with respect to a CSI-RS sent by a certain RRH of the RRHs in the CoMP set, and if the radio link failure occurs on the CSI-RS sent by the certain RRH, then this RRH is deleted from the RRHs in the CoMP set. Under the situation that the total number of the RRH in the CoMP set that provides service for the user terminal is limited, deleting the RRH with a poor signal quality can enable an RRH that is capable of providing the user terminal a reference signal with a better quality to be added into the CoMP set in time, so as to provide for the user terminal to use, thereby improving the experience on the user terminal.

Figure 4:
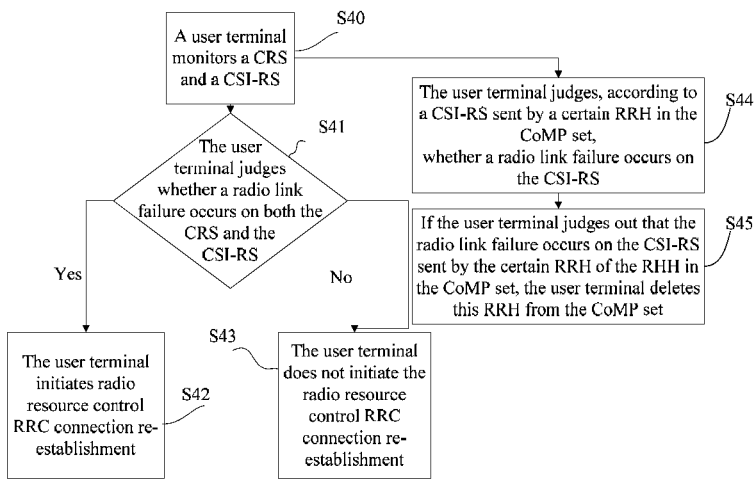
FIG. 4 is a schematic flowchart of a method for monitoring a radio link according to a third embodiment of the present disclosure.

A third embodiment of the present disclosure provides a method for monitoring a radio link, as shown in FIG. 4, the method includes the following contents.

The third embodiment of the present disclosure is a further refinement of the first embodiment of the present disclosure, and the technical features of method, conceptions, and effects etc. in the first embodiment of the present disclosure is applicable to the third embodiment of the present disclosure.

S40: a user terminal monitors a CRS and a CSI-RS.

S41: the user terminal judges whether a radio link failure occurs on both the CRS and the CSI-RS, according to the CRS and the CSI-RS monitored.

The CRS in the third embodiment of the present disclosure may be a CRS sent by a macro cell; and the CSI-RS in the third embodiment of the present disclosure may be a CSI-RS sent by a RRH in a CoMP set.

S42: if the user terminal judges out that the radio link failure occurs on both the CRS sent by the macro cell and the CSI-RS sent by the RRH in the CoMP set, the user terminal initiates RRC connection re-establishment.

Optionally, the method in the third embodiment of the present disclosure may further include:

S43: if the user terminal judges out that no radio link failure occurs on the reference signals sent by the macro cell and the RRH in the CoMP set or the radio link failure does not occur on both the reference signals sent by the macro cell and the RRH, the user terminal does not initiate the RRC connection re-establishment.

As an example, in the third embodiment of the present disclosure, reference may be made to the description in the first embodiment of the present disclosure for the user terminal judging whether a radio link failure occurs on both the CRS sent by the macro cell and the CSI-RS sent by the RRH in the CoMP set, which includes:

S41-1: a physical layer of the user terminal sends out-of-synchronization indication or in-synchronization indication to the user terminal according to the reference signal (the reference signal may be the CRS, and also may be the CSI-RS).

As an example, the user terminal monitors the signal quality of the CRS and the CSI-RS. If the signal quality of the CRS or the CSI-RS meets the requirement of in-synchronization or out-of-synchronization, the physical layer of the user terminal sends the out-of-synchronization indication or the in-synchronization indication to the RRC layer of the user terminal. Reference may be made to 3GPP TS 36.133 about how the physical layer of the user terminal sends the out-of-synchronization indication and the in-synchronization indication to the user terminal according to the reference signal, which will be neither repeated nor limited hereby.

S41-2: the RRC layer of the user terminal judges whether the radio link failure occurs on both the reference signals according to the out-of-synchronization indication or the in-synchronization indication.

Optionally, the method in the third embodiment of the present disclosure may further include:

S44: the user terminal judges whether the radio link failure occurs on the CSI-RS according to the CSI-RS sent by a certain RRH in the CoMP set.

S45: if the user terminal judges out that the radio link failure occurs on the CSI-RS sent by the certain RRH in the CoMP set, the user terminal delete this RRH from the CoMP set.

By applying the technical solutions provided in the third embodiment of the present disclosure, a user terminal judges whether to initiate RRC connection re-establishment according to the CRS and the CSI-RS, instead of judging whether to initiate RRC connection re-establishment only according to the CRS. Thus, the user terminal can perform monitoring the radio link more accurately, and perform RRC connection re-establishment in time, to reduce occurrence of misjudgment, thereby improving the experience on the user terminal. Specifically, under the situation that the macro cell sends the CRS, and the RRH in the CoMP set sends only the CSI-RS, if a user terminal, locating at the edge of the macro cell performs monitoring a radio link failure only according to the CRS sent by the macro cell, at this time the signal quality of the CRS sent by the macro cell is poor, and then the user terminal judges out that the radio link failure occurs, thereupon the user terminal initiates RRC connection re-establishment. However, the fact is that there may be a RRH which is nearer to the user terminal than the macro cell, and the RRH sends a CSI-RS with a better signal quality, and the user terminal actually does not need to initiate RRC connection re-establishment, in this way, a misjudgment is generated. And thus, in the technical solution provided in the third embodiment of the present disclosure, the user terminal initiates RRC connection re-establishment when the user terminal judges out that the radio link failure occurs on both the CRS sent by the macro cell and the CSI-RS sent by the RRH in the CoMP set, which can avoid such kind of misjudgment, thereby improving the experience on the user terminal.

Furthermore, the user terminal may further judge whether a radio link failure occurs with respect to a CSI-RS sent by a certain RRH of the RRHs in the CoMP set, and if the radio link failure occurs on the CSI-RS sent by the certain RRH, this RRH is deleted from the RRH in the CoMP set. Under the situation that the total number of the RRH in the CoMP set which provides service for the user terminal is limited, deleting the RRH with a poor signal quality can enable an RRH that can provide the user terminal a reference signal with a better quality to be added into the CoMP set timely, so as to provide for the user terminal to use, thereby improving the experience of the user.

Figure 5A:
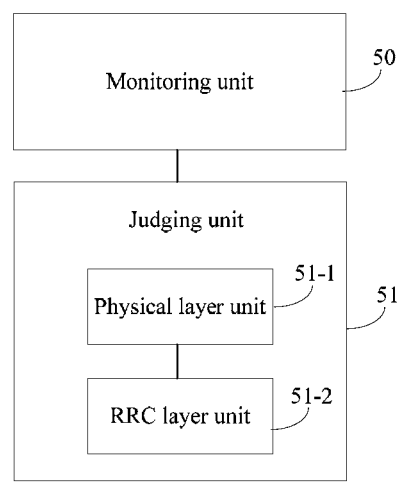
FIG. 5A-FIG. 5C are schematic structural diagrams of a device for monitoring a radio link according to a fourth embodiment of the present disclosure.

A fourth embodiment of the present disclosure provides a device for monitoring a radio link, as shown in FIG. 5A, the device includes:

a monitoring unit 50, configured to monitor a CRS and a CSI-RS; and a judging unit 51, configured to judge whether to initiate RRC connection re-establishment, according to the CRS and the CSI-RS monitored.

Optionally, in the fourth embodiment of the present disclosure, the judging unit 51 includes a physical layer unit 51-1 and a RRC layer unit 51-2;

The physical layer unit 51-1 sends out-of-synchronization indication or in-synchronization indication to the RRC layer unit 51-2 of the judging unit 51 according to the CRS and the CSI-RS; the RRC layer unit 51-2 is configured to judge whether a radio link failure occurs according to the out-of-synchronization indication or the in-synchronization indication; if yes, the RRC layer unit 51-2 judges out that there is a need to initiate the RRC connection re-establishment; if no, the RRC layer unit 51-2 judges out that there is no need to initiate the RRC connection re-establishment.

Furthermore, the out-of-synchronization indication or the in-synchronization indication sent to the RRC layer unit 51-2 by the physical layer unit 51-1 according to the CRS and the CSI-RS includes an identifier, the identifier is used for the RRC layer unit 51-2 to identify the out-of-synchronization indication or the in-synchronization indication of the CRS and the out-of-synchronization indication or the in-synchronization indication of the CSI-RS.

As an example, the monitoring unit 50 is configured to monitor a CRS sent by a macro cell and a CRS sent by a RRH in a CoMP set, and a CSI-RS sent by the RRH in the CoMP set. Correspondingly, the judging unit 51 is configured to judge, according to the CRS and the CSI-RS, whether a radio link failure occurs on at least one of the CRS and the CSI-RS; if yes, the judging unit 51 judges out that RRC connection re-establishment needs to be initiated; if no, the judging unit 51 judges out that the RRC connection re-establishment does not need to be initiated.

As another example, the monitoring unit 50 is further configured to monitor the CRS sent by the macro cell, and the CSI-RS sent by the RRH in the CoMP set. Under this situation, the macro cell sends the CRS, and the RRH in the CoMP set sends only the CSI-RS. Correspondingly, the judging unit 51 is configured to judge, according to the CRS and the CSI-RS, whether a radio link failure occurs on both the CRS and the CSI-RS; if yes, the judging unit 51 judges out that RRC connection re-establishment needs to be initiated; if no, the judging unit 51 judges out that the RRC connection re-establishment does not need to be initiated.

Figure 5B:
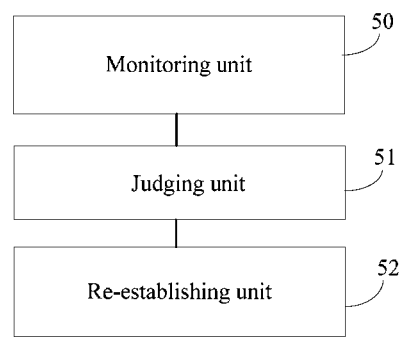

Optionally, as shown in FIG. 5B, the device further includes: a re-establishing unit 52, configured to, if the judging unit 51 judges out that the RRC connection re-establishment needs to be initiated, initiate the RRC connection re-establishment.

Figure 5C:
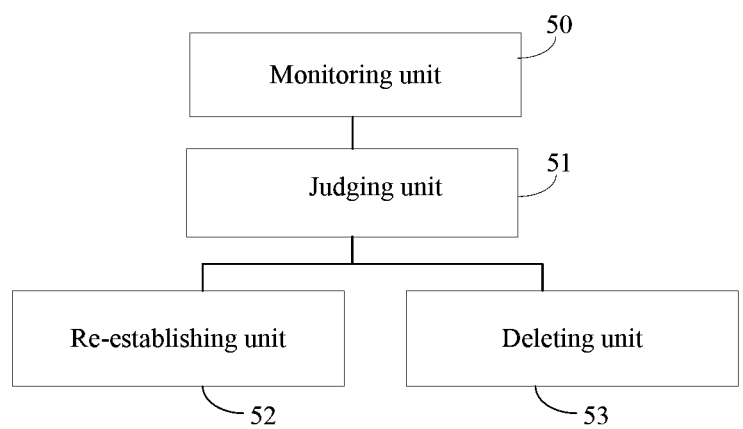

Optionally, the judging unit 51 is further configured to judge the CSI-RS sent by which one of the RRH in the CoMP set the radio link failure occurs on. Correspondingly, as shown in FIG. 5C, the device in the fourth embodiment of the present disclosure further includes: a deleting unit 53, configured to, if the judging unit 51 judges out that the radio link failure occurs on the CSI-RS sent by a certain RRH of the RRHs in the CoMP set, delete this RRH from the CoMP set.

The device for monitoring a radio link provided in the fourth embodiment of the present disclosure may execute the method described in any one of embodiments from the first embodiment to the third embodiment of the present disclosure, persons of ordinary skill in the art may understand that, for the steps in the embodiments of method, there is corresponding units in the device to execute, and these units can be integrated together, or exist separately, which will not be limited hereby. The division of the device in the embodiment of the present disclosure, may be in accordance with the functions (e.g. the judging unit 51 is divided into different function units in accordance with the different method step to execute), and may also be in accordance with the communication protocols (e.g. the judging unit 51 is divided into a physical layer unit 51-1 and a RRC layer unit 51-2), which will not be limited hereby. Furthermore, the device provided in the fourth embodiment of the present disclosure, in order to execute actions or steps in the embodiments of method, may further includes other electronic circuits, interfaces and electronic devices, the details will not be repeated hereby.

By applying the technical solutions provided in the fourth embodiment of the present disclosure, the device for monitoring a radio link, the device judges whether to initiate RRC connection re-establishment according to the CRS and the CSI-RS, instead of judging whether to initiate the RRC connection re-establishment only according to the CRS. Thus, the device can perform monitoring the radio link more accurately, and perform the RRC connection re-establishment in time, to reduce the occurrence of misjudgment, thereby improving the experience on a user terminal.

Furthermore, the device for monitoring a radio link, may further judge whether a radio link failure occurs for a CSI-RS sent by a certain RRH of the RRHs in the CoMP set, and under the situation that if the radio link failure occurs on the CSI-RS sent by the certain RRH, this RRH is deleted from the RRH in the CoMP set by the deleting unit. Under the situation that the total number of the RRH in the CoMP set which provides service for the device for monitoring a radio link is limited, deleting the RRH with a poor signal quality can enable an RRH which can provide a reference signal with a better quality for the device for monitoring a radio link to be added into this CoMP set in time, so as to provide for the device to use.

The device for monitoring a radio link provided in the fourth embodiment of the present disclosure may be included in a user terminal. The user terminal applying the device provided in the embodiments of the present disclosure may also solve the above technical problem and achieve corresponding technical effects.

In some embodiments, no details are provided for the known method, interfaces, device signaling technologies, so as to avoid that unnecessary details make the present disclosure vague. Persons of ordinary skills in the art may understand that all or part of the steps of the methods according to embodiments of the present disclosure may be implemented by a program instructing relevant hardware, and the program may be stored in a computer readable storage medium, where the storage medium, may be: a read only memory (ROM), a random access memory (RAM), a magnetic disk, or an optical disk and etc.

The objectives, the technical solutions and the beneficial effects have been described in details in the foregoing embodiments. However, it should be understood that, the above description is merely intended for describing the embodiments other than limiting the protection scope of the present disclosure, thus any modifications, equivalent substitutions, improvements and etc. made by the persons of ordinary skill in the art without creative efforts should fall in the protection scope of the present disclosure.

What is claimed is:

1. A method for monitoring a radio link, comprising:
   monitoring, by a user terminal, a cell specific reference signal (CRS) and a channel state indication reference signal (CSI-RS); and
   judging, by the user terminal, according to the CRS and the CSI-RS, whether to initiate radio resource control (RRC) connection re-establishment, comprising:
      judging, by the user terminal, whether a radio link failure occurs on the CRS, wherein the CRS is a superposition of a CRS sent by a macro cell and a CRS sent by a radio remote head (RRH) in a coordinated multipoint transmission/reception (CoMP) set;
      in response to judging that no radio link failure occurs on the CRS, judging, by the user terminal, whether a radio link failure occurs on the CSI-RS, wherein the CSI-RS is a CSI-RS sent by the RRH in the CoMP set; and
      in response to judging that a radio link failure occurs on the CSI-RS, initiating, by the user terminal, the RRC connection re-establishment.

2. The method according to claim 1, wherein the method further comprises:
   judging, by the user terminal, whether a radio link failure occurs on a RRH of RRHs in the CoMP set; and
   in response to judging that the radio link failure occurs on the CSI-RS sent by the RRH of RRHs in the CoMP set, deleting, by the user terminal, the RRH from the CoMP set.

3. The method according to claim 1, wherein the judging, by the user terminal, according to the CRS and the CSI-RS, whether to initiate RRC connection re-establishment, comprises:
   sending, by a physical layer of the user terminal, according to the CRS and the CSI-RS, out-of-synchronization indication or in-synchronization indication of the CRS and out-of-synchronization indication or in-synchronization indication of the CSI-RS, to an RRC layer of the user terminal; and
   judging, by the RRC layer of the user terminal, whether to initiate the RRC connection re-establishment, according to the out-of-synchronization indication or the in-synchronization indication of the CRS and the out-of-synchronization indication or the in-synchronization indication of the CSI-RS.

4. The method according to claim 3, wherein the sending, by the physical layer of the user terminal, according to the CRS and the CSI-RS, the out-of-synchronization indication or the in-synchronization indication of the CRS and the out-of-synchronization indication or the in-synchronization indication of the CSI-RS, to the RRC layer of the user terminal, comprises:
   sending, by the physical layer of the user terminal, according to the CRS and the CSI-RS, the out-of-synchronization indication or the in-synchronization indication to the RRC layer of the user terminal, wherein the out-of-synchronization indication or the in-synchronization indication comprises an identifier, and the identifier is used for the RRC layer of the user terminal to identify the out-of-synchronization indication or the in-synchronization indication of the CRS and the out-of-synchronization indication or the in-synchronization indication of the CSI-RS.

5. A device for monitoring a radio link, comprising a processor and a non-transitory computer readable storage medium including executable instructions that, when executed by the processor, cause the device to:
   monitor a cell specific reference signal (CRS) and a channel state indication reference signal (CSI-RS); and
   judge according to the CRS and the CSI-RS, whether to initiate radio resource control (RRC) connection re-establishment, comprising:
      judge whether a radio link failure occurs on the CRS, wherein the CRS is a superposition of a CRS sent by a macro cell and a CRS sent by a radio remote head (RRH) in a coordinated multipoint transmission/reception (CoMP) set;
      in response to judging that no radio link failure occurs on the CRS, judge whether a radio link failure occurs on the CSI-RS, wherein the CSI-RS is a CSI-RS sent by the RRH in the CoMP set; and
      in response to judging that a radio link failure occurs on the CSI-RS, initiate the RRC connection re-establishment.

6. The device according to claim 5, wherein executing the instructions by the processor further causes the device to:
   in response to judging that the radio link failure occurs on the CSI-RS sent by the RRH of RRHs in the CoMP set, delete the RRH from the CoMP set.

7. The device according to claim 5, wherein the judging, according to the CRS and the CSI-RS, whether to initiate RRC connection re-establishment, comprises:
   sending, by a physical layer of the device, according to the CRS and the CSI-RS, out-of-synchronization indication or in-synchronization indication of the CRS and out-of-synchronization indication or in-synchronization indication of the CSI-RS, to an RRC layer of the device; and
   judging, by the RRC layer of the device, whether to initiate the RRC connection re-establishment, according to the out-of-synchronization indication or the in-synchronization indication of the CRS and the out-of-synchronization indication or the in-synchronization indication of the CSI-RS.

8. The device according to claim 7, wherein the sending, by the physical layer of the device, according to the CRS and the CSI-RS, the out-of-synchronization indication or the in-synchronization indication of the CRS and the out-of-synchronization indication or the in-synchronization indication of the CSI-RS, to the RRC layer of the device, comprises:

sending, by the physical layer of the device, according to the CRS and the CSI-RS, the out-of-synchronization indication or the in-synchronization indication to the RRC layer of the device, wherein the out-of-synchronization indication or the in-synchronization indication comprises an identifier, and the identifier is used for the RRC layer of the device to identify the out-of-synchronization indication or the in-synchronization indication of the CRS and the out-of-synchronization indication or the in-synchronization indication of the CSI-RS.

* * * * *